Aug. 1, 1944.　　　　P. SPENCE　　　　2,354,842
DESUPERHEATER
Original Filed Aug. 6, 1938
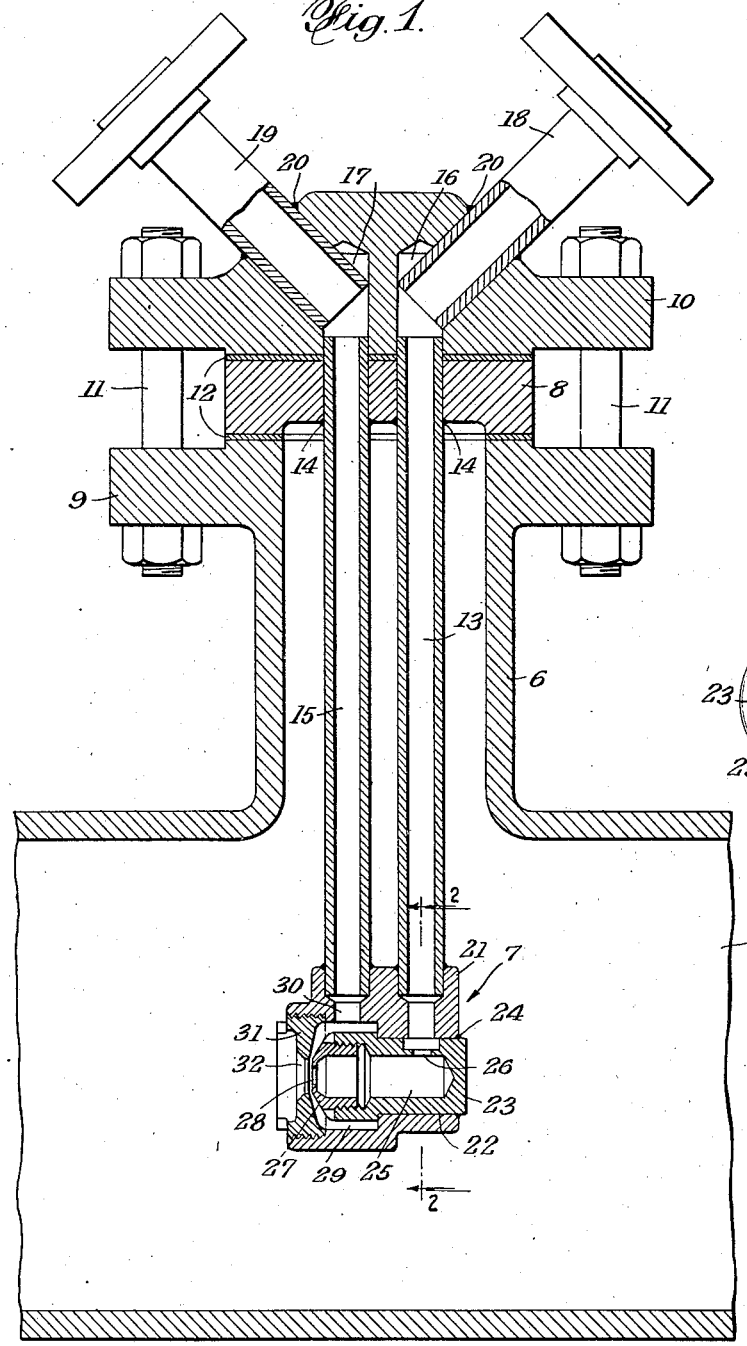
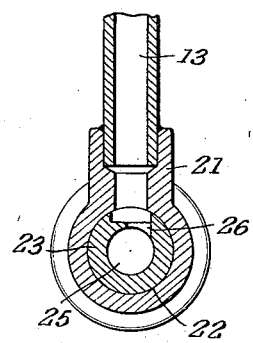
INVENTOR
PAULSEN SPENCE
BY
ATTORNEYS.

Patented Aug. 1, 1944

2,354,842

UNITED STATES PATENT OFFICE 2,354,842

DESUPERHEATER

Paulsen Spence, East Orange, N. J., assignor to Spence Engineering Company, Inc., Walden, N. Y., a corporation of New York Original application August 6, 1938, Serial No. 223,444. Divided and this application February 23, 1942, Serial No. 431,977

7 Claims. (Cl. 261—116)

My invention relates to a desuperheater, and this application is a division of my application Serial No. 223,444, filed August 6, 1938, now Patent 2,293,314 dated August 18, 1942.

As is well known, in many power plants steam is generated under high pressure and is given a high degree of superheat. In such stations steam usually at a lower pressure and having a lower temperature, even down to the temperature of saturated steam, is often required for the operation of auxiliaries, heating systems, processing and the like. In many cases it is highly important that an uninterrupted supply of desuperheated steam be supplied and it is furthermore important that neither the temperature nor the pressure of the desuperheated steam shall exceed certain limits. A further requirement of a desuperheater in many cases is that it shall be adapted for the making of quick repairs or replacements. My improved desuperheater is believed to fully comply with all of the above requirements.

It is an object of my invention, therefore, to provide an improved form of desuperheater in which shut-downs for repairs or replacements will be reduced to a minimum.

A further object is to provide a desuperheater which is simple in construction, not likely to get out of order, and serviceable in use.

Another object is to provide an improved desuperheater unit which may be very quickly removed from the line for making repairs or renewals and again quickly returned to the line.

Another object is to provide an improved form of desuperheater in which the water is divided into very fine particles so as to be readily vaporized by the superheated steam.

Other objects and various features of novelty and improvement will be hereinafter pointed out or will become apparent to those skilled in the art.

In the drawing which shows, for illustrative purposes only, a preferred form of the invention—

Fig. 1 is a central, sectional view through a part of the desuperheated steam line and one form of my improved desuperheater;

Fig. 2 is a fragmentary, sectional view taken substantially in the plane of the line 2—2 of Fig. 2.

In the form shown, 5 indicates a desuperheated steam line which will usually be maintained at a lower pressure than the main boiler plant steam line and the steam in the line 5 will be desuperheated to the desired degree, even down to the temperature of saturated steam at the particular pressure under which the line 5 is held.

My present invention relates only to the desuperheating unit and therefore only such parts as are necessary to that unit have been shown, but it is to be understood that the line 5 will normally be connected through a regulating or reducing valve to the main high pressure superheated steam line from the boiler. A suitable reducing or regulating valve is that shown in my Patent No. 1,995,949, dated March 26, 1935. Such a regulating valve will normally maintain the desired pressure in the line 5, even though the main pilot operating the main regulating valve should be ruptured or damaged. Furthermore, the regulating valve shown in my said patent may be controlled by the temperature of steam in the desuperheated line 5 so as to shut off the regulating valve in case the temperature in the line 5 should for any reason reach a predetermined abnormally high limit. The desuperheater system in its preferred combination form will now be described.

The line 5 is provided with a T-fitting 6 through which the desuperheater unit 7 is dropped and held in the line 5 with the water nozzle facing into the oncoming steam. The improved desuperheater in its preferred form comprises a head or flange 8 which may fit upon the flange 9 of the T-fitting 6 and be rigidly held between said flange 9 and a cap flange 10 secured to the flange 9 as by means of flange bolts 11—11. Suitable gaskets 12—12 serve to make a steam-tight joint between the head 8 and the flanges 9—10. A water pipe 13 is rigidly secured in the head flange 8 preferably by means of a circumferential weld 14. A steam pipe 15 is similarly held to the head flange 8 as by a similar weld 14. The pipes 13—15 extend completely through the head flange 8 and into bores 16—17 in the cap flange 10. A water connection 18 and steam connection 19 are made to the flange cap 10 and pipes 18—19 extend into the bores 16—17 so that there is free communication between the steam pipes and the water pipes, as will be clear. The water and steam pipes 18—19 are preferably rigidly secured to the cap flange 10 by means of circumferential welds 20.

A desuperheater nozzle head 21 is secured to and carried by the lower ends of the pipes 13—15. The head 21 is preferably welded to the pipes as shown. In the form shown the head 21 has a longitudinal bore 22 for the reception of a water nozzle plug 23 which fits in the bore and may be secured therein as by a circumferential weld 24. The plug 23 has an axial bore or passage 25 therein and the port 26 entering the bore 25 and forming a communication with the water pipe 13 enters at an angle to the axis of the bore 25 and eccentrically thereto as will be clear. In the forward end of the plug 23 is a removable water nozzle fitting 27 having a restricted water outlet 28. The purpose of the angular and eccentric relationship of the port 26 and the bore 25 is to cause the water in passing from the pipe 13 to the exit vent 28 to rotate or swirl in spiral form and issue from the water nozzle in the form of a spray cone so that the water may be in a finely divided state and thus be readily taken up by the superheated steam flowing against the spray cone. The nozzle head 21 is counterbored so as to provide an annular space 29 about the water nozzle and a port 30 permits passage of steam from the pipe 15 to such annular space. A steam nozzle fitting 31 is removably secured in the end of the counterbore in the head 21 and is provided with an outlet passage 32 concentric with the passage 28 of the water nozzle. Thus, the water issuing in the form of a cone from the water nozzle will be further broken up by the steam and, in fact, atomized so that it may be quickly and readily vaporized. The steam atomizing effect on the water is quite important when there is but a slight flow of water, which slight flow has a lesser tendency to form a spray cone. If only a drip of water issues from the water nozzles, the steam will serve to atomize that drip. When a greater volume of water flows, the cone effect heretofore noted will result and the steam while now not so necessary will simply serve to more fully break up or atomize the water in the cone, all with the effect of providing a fine spray which is quickly vaporized by the superheated steam.

It will be seen that the T-fitting 6 is of such size that the head 8, water and steam pipes 13—15, and entire nozzle head may be removed as a unit, the nozzle head and pipes passing freely through the opening in the T-fitting. If repairs or renewals are required, it will be seen that it will be a relatively simple matter to remove the entire desuperheater head and replace the same with a spare unit with a minimum amount of down time for the line. The T-fitting may be of any suitable angle, such as a Y or a right angle T, as shown.

While one form of the invention has been shown and described in detail, it is to be understood that various changes may be made within the scope of the appended claims.

I claim:

1. A nozzle head for a desuperheater including a head body having a bore therein, a water nozzle plug in said bore and having a longitudinally extending passage therein, a water nozzle detachably secured to said plug and having an exit passage therein, a water inlet connection to the passage of said plug, said water inlet connection entering said plug at an angle to the axis thereof and eccentrically of the passage therein, and a steam nozzle detachably secured to said head body and having an exit passage concentric with the exit passage of said water nozzle, a steam inlet connection to said head body, and an annular space surrounding said water nozzle and open to said steam inlet, whereby steam may flow concentrically of said water nozzle and steam and sprayed water may issue simultaneously from said nozzle.

2. In a desuperheater, a main steam pipe having a flanged fitting thereon, a head member on said flanged fitting, said head member having water and steam pipes rigidly secured therein, a nozzle head carried by and rigidly secured to said water and steam pipes, said nozzle head embodying steam and water nozzles, said nozzle head and water and steam pipes being of a size to freely pass through said flanged fitting on said main steam pipe, a flanged cap fitting on said head, said flanged cap having water and steam connections communicating respectively with said water and steam pipes carried by said head, and means for securing said flanged fitting and flanged cap to each other with said head interposed therebetween and held in steam-tight connection with said flanged fitting and flanged cap.

3. In a desuperheater, a main steam line having a T-fitting extending laterally therefrom, desuperheater means carried by said T-fitting, said desuperheater means including atomizing steam and water pipes extending through said T-fitting and into said main steam line, a desuperheater nozzle means carried at the inner ends of said atomizing steam and water pipes and having spray means for spraying water into said main steam line and at substantially right angles to said atomizing steam and water pipes.

4. In a desuperheater, a main steam line having a T-fitting extending laterally therefrom, desuperheater means carried by said T-fitting, said desuperheater means including atomizing steam and water pipes extending through said T-fitting and into said main steam line, a desuperheater nozzle means carried at the inner ends of said atomizing steam and water pipes and having spray means for spraying water into said main steam line, said desuperheater means including said nozzle means being removable from said T-fitting as unit.

5. In a desuperheater, a steam line having a T-fitting extending laterally therefrom, steam atomizing desuperheater means comprising atomizing steam and water conducting means having adjacent outlets, said desuperheater means being unitarily assembled with a support, means for securing said support to said T-fitting with said outlets positioned to discharge into said steam line, said T-fitting being of a size to freely pass the outlet portions of said desuperheater, for the purpose described.

6. In a desuperheater, a steam line having a T-fitting extending laterally therefrom, steam atomizing desuperheater means including steam and water nozzle means positioned adjacent each other and positioned in said steam line through said T-fitting, water and steam pipes communicating with said nozzle means and supporting the latter, a support, said steam and water pipes being secured to said support, means for securing said support to said T-fitting, said T-fitting being of a size to freely pass said desuperheater means and steam and water pipes connected thereto.

7. A nozzle head for a desuperheater including a head body having a bore therein, a water nozzle plug fitting in said bore, a separate water nozzle secured to said plug, said plug and water nozzle having water passage means communicating with a source of water supply, a separate steam nozzle secured to said head body and having a steam exit passage concentric with said water nozzle, said head body having a steam passage communicating with said steam nozzle, said steam and water nozzles being positioned adjacent each other at their discharge ends and defining between them an annular space to cause steam to escape annularly of said water nozzle for atomizing water discharging from said water nozzle.

PAULSEN SPENCE.